United States Patent
Oikawa et al.

(10) Patent No.: US 6,696,172 B2
(45) Date of Patent: Feb. 24, 2004

(54) RECORDING MEDIUM AND METHOD FOR MANUFACTURING THE SAME

(75) Inventors: Tadaaki Oikawa, Nagano (JP); Hiroyuki Uwazumi, Nagano (JP); Takahiro Shimizu, Nagano (JP); Naoki Takizawa, Nagano (JP)

(73) Assignee: Fuji Electric Co., Ltd., Kawasaki (JP)

( * ) Notice: Subject to any disclaimer, the term of this patent is extended or adjusted under 35 U.S.C. 154(b) by 89 days.

(21) Appl. No.: 10/032,713

(22) Filed: Oct. 22, 2001

(65) Prior Publication Data
US 2002/0136926 A1 Sep. 26, 2002

(30) Foreign Application Priority Data
Oct. 20, 2000 (JP) ........................... 2000-321700

(51) Int. Cl.7 .................. G11B 5/66; G11B 5/673
(52) U.S. Cl. ............ 428/611; 428/640; 428/668; 428/409; 428/694 TS; 428/698; 428/702
(58) Field of Search ................ 428/611, 640, 428/663, 668, 409, 694 TS, 698, 702

(56) References Cited
U.S. PATENT DOCUMENTS

| | | | |
|---|---|---|---|
| 5,658,659 A | * 8/1997 | Chen et al. | 428/332 |
| 5,679,473 A | 10/1997 | Murayama et al. | 428/694 |
| 5,774,783 A | * 6/1998 | Kaitsu et al. | 428/546 |
| 6,177,208 B1 | * 1/2001 | Yamamoto et al. | 428/692 |
| 6,242,086 B1 | * 6/2001 | Song et al. | 428/336 |
| 6,479,169 B1 | * 11/2002 | Chang et al. | 428/667 |
| 2002/0034665 A1 | * 3/2002 | Nakazawa et al. | 428/694 TS |

FOREIGN PATENT DOCUMENTS
JP 08-255342 10/1996

* cited by examiner

Primary Examiner—Paul Thibodeau
Assistant Examiner—Kevin M. Bernatz
(74) Attorney, Agent, or Firm—Darby & Darby

(57) ABSTRACT

A magnetic recording medium has at least a non-magnetic under-layer, a magnetic layer, a protective layer and a liquid lubricant layer sequentially laminated on a non-magnetic substrate. The magnetic layer includes ferromagnetic grains and non-magnetic grain boundaries formed of metallic oxide or carbide surrounding the ferromagnetic grains. A non-magnetic intermediate layer, having grains of non-magnetic substance and non-magnetic grain boundaries, formed of metallic oxide or carbide, surrounding the grains of non-magnetic substance, is provided between the non-magnetic under-layer and the magnetic layer. The resulting magnetic recording medium exhibits a high coercive force, Hc, and low noise. Furthermore, the resulting magnetic recording medium prevents the deterioration of the media characteristics in an initial growth region in the granular magnetic layer.

5 Claims, 2 Drawing Sheets

Product Brδ Residual Magnetic Flux Density
And Layer Thickness (G μm)

RECORDING MEDIUM AND METHOD FOR MANUFACTURING THE SAME

FIELD OF THE INVENTION

The present invention relates to a magnetic recording medium. More specifically, the present invention relates to a magnetic recording medium installed in a variety of magnetic recording devices, such as an external memory of a computer. Furthermore, the present invention relates to a method for manufacturing such a magnetic recording medium.

BACKGROUND OF THE INVENTION

With a rapidly increasing demand for a high-density and low-noise magnetic recording medium in recent years, a variety of compositions and structures of a magnetic layer, a variety of materials for a non-magnetic under-layer and a seed layer, and the like have been proposed. In particular, there has been proposed a magnetic layer that is generally called a granular magnetic layer, in which ferromagnetic grains are surrounded by a non-magnetic non-metallic substance such as an oxide or a nitride.

For example, Japanese Patent Laid-Open Publication No. 8-255342 discloses that a non-magnetic layer, a ferromagnetic layer and a non-magnetic layer are sequentially laminated on a non-magnetic substrate. A heating process is then carried out to form a granular recording layer, in which, in order to decrease noise, ferromagnetic grains are dispersed in the non-magnetic layer. The magnetic layer is made of a cobalt alloy or a cobalt-based alloy. The non-magnetic layer is made of metal, oxide, nitride, carbon or carbide. U.S. Pat. No. 5,679,473 discloses RF (Radio Frequency) sputtering using a CoNiPt target with an oxidem such as $SiO_2$, added thereto, to form a granular recording layer, in which grains of magnetic substance surrounded by non-magnetic oxide are dispersed separately, thus achieving high Hc and low noise.

The granular magnetic layer with the above arrangement is considered to achieve the low noise characteristics since the physical separation of magnetic particles by a non-magnetic nonmetallic grain boundary phase reduces the magnetic interaction between magnetic particles. This controls the formation of a zigzag magnetic domain wall in a transitional region of a recording bit.

The noise of the recording medium is caused by the fluctuation of magnetization that occurs according to the size of magnetic particles constituting the medium and the magnetic particle-to-particle interaction. To maintain a high S/N in conformity with the increase in the recording density, it is necessary to keep the number of magnetic particles per bit cell at a predetermined value or more, i.e. it is necessary to refine the magnetic particles. When there is a great exchange interaction between the magnetic particles, refining the grain particles does not necessarily refine a unit of magnetic inversion in many cases. Therefore, it is necessary to inhibit the particle-to-particle exchange interaction in order to refine a unit of magnetic inversion expressed by magnetic moment of activation. Further, in refining the magnetic particles, the magnetic particles themselves require magnetic anisotropy energy being large to a certain extent in order to achieve the magnetic characteristics (high Hc/Mrt) required for high-resolution recording without coming into a super-paramagnetic state. The granular structure in which the magnetic particles with high magnetic anisotropy energy are dispersed in a non-magnetic matrix is intended to satisfy all of the above strict requirements for higher S/N.

When a conventional CoCr metal magnetic layer is formed at a high temperature, Cr is segregated from Co magnetic grains to be deposited on grain boundaries to thus reduce the magnetic interaction between magnetic particles. On the other hand, a granular magnetic layer is capable of accelerating the isolation of grains of magnetic substance relatively easily because a grain boundary phase is made of non-magnetic non-metallic substance to thus make it easier the segregation of Cr compared with the conventional magnetic layer. Particularly, the conventional CoCr metal magnetic layer requires the increase in the temperature of a substrate to 200° C. or more during the formation thereof in order to sufficiently segregate Cr, whereas the granular magnetic layer enables segregation of its non-magnetic non-metallic substance even if it is formed without heating.

In the case of a magnetic recording medium having a granular magnetic layer, it is necessary to add a relatively large amount of Pt to a Co alloy in order to achieve desired magnetic characteristics and, more particularly, high magnetic coercive force Hc. In order to achieve Hc of about 2800 Oe, the granular magnetic layer requires expensive Pt of 16 atomic %, whereas a normal CoCr metallic magnetic layer requires Pt of only about 8 atomic %. In recent years, there has been an increasing demand for very high Hc of 3200 Oe or more with the increase in the magnetic recording density, and thus, the granular magnetic layer requiring a large amount of expensive Pt is disadvantageous because it increases the manufacturing cost. There has also been a demand for decreasing media noise with the increase in the recording density.

Further, the granular magnetic layer causes deterioration of the magnetic characteristics and the electromagnetic conversion characteristics at a small Br δ (product of residual magnetic flux density and layer thickness) since a clear granular structure cannot be formed due to the unstable grain growth in a region with a small layer thickness (initial growth region). As the small layer thickness of the magnetic layer increases with the increase in the recording density in the future, it is important to develop the technique for preventing the deterioration of the media characteristics in the initial growth region in the granular magnetic layer.

OBJECTS AND SUMMARY OF THE INVENTION

It is an object of the present invention to provide a magnetic recording medium which overcomes the foregoing problems.

To solve the above described problems, the present invention provides a magnetic recording medium in which at least a non-magnetic under-layer, a magnetic layer, a protective layer and a liquid lubricant layer are sequentially laminated on a non-magnetic substrate. The magnetic layer comprises ferromagnetic grains and non-magnetic grain boundaries formed of metallic oxide or carbide surrounding the ferromagnetic grains. A non-magnetic intermediate layer comprised of grains of non-magnetic substance and non-magnetic grain boundaries formed of metallic oxide or carbide surrounding the grains of non-magnetic substance is provided between the non-magnetic under-layer and the magnetic layer.

In one preferred form of the present invention, the non-magnetic intermediate layer is formed of two or more laminated layers having identical or different compositions.

In another preferred form of the present invention, the grains of non-magnetic substance in the non-magnetic intermediate layer are CoCr alloys or CoCrPt alloys.

In yet another preferred form of the present invention, the non-magnetic under-layer is made of Cr or Cr alloy.

In yet another preferred form of the present invention, the non-magnetic substrate is crystallized glass, reinforced glass, or plastic.

The present invention also provides a method for manufacturing a magnetic recording medium in which at least a non-magnetic under-layer, a magnetic layer, a protective layer and a liquid lubricant layer are sequentially laminated on a non-magnetic substrate, the method comprising the steps of a) laminating a non-magnetic under-layer on the non-magnetic substrate; b) laminating, on the non-magnetic under-layer, a non-magnetic intermediate layer comprised of grains of non-magnetic substance and a non-magnetic grain boundaries formed of metallic oxide or carbide surrounding the grains of non-magnetic substance; c) laminating, on the non-magnetic intermediate layer, the magnetic layer comprised of ferromagnetic grains and non-magnetic grain boundaries formed of metallic oxide or carbide surrounding the ferromagnetic grains; d) laminating the protective layer on the magnetic layer; e) laminating the liquid lubricant layer on the protective layer; and f) wherein each step is carried out without heating the non-magnetic substrate in advance.

In one preferred form of the present invention, the step of laminating the non-magnetic intermediate layer comprises laminating two or more non-magnetic layers each comprised of grains of non-magnetic substance and non-magnetic grain boundaries formed of metallic oxide or carbide surrounding the grains of non-magnetic substance, the non-magnetic layers having identical or different compositions.

The above, and other objects, features and advantages of the present invention will become apparent from the following description read in conjunction with the accompanying drawings, in which like reference numerals designate the same elements.

DETAILED DESCRIPTION OF THE INVENTION

The present invention will hereinafter be described in further detail.

The present invention provides a magnetic recording medium having a granular magnetic layer with a high-quality segregation structure so as to exhibit high magnetic coercive force (Hc) and low noise. A non-magnetic granular intermediate layer with the same granular structure as a magnetic layer, i.e. a non-magnetic granular intermediate layer, which is comprised of grains of non-magnetic substance and a non-magnetic layer grain boundaries formed of metallic oxide or carbide surrounding the grains of non-magnetic substance, is formed between the granular magnetic layer and a non-magnetic under-layer in the magnetic recording medium. It was found that such structure increases the magnetic coercive force (Hc) and reduces the noise to a larger degree compared with a conventional magnetic recording medium having a granular magnetic layer.

While not holding themselves to a specific theory, Applicants believe this result is from the increase in crystallinity caused by the epitaxial growth of ferromagnetic grains in the magnetic layer having the granular structure due to the presence of the non-magnetic intermediate layer having the granular structure in the formation of the magnetic layer.

It was also found that forming the non-magnetic granular intermediate layer by two or more layers reduces the size of the grains in the intermediate layer formed just under the magnetic layer and clarifies the granular structure of the intermediate layer itself, so that the granular magnetic layer, which is grown by the epitaxial method, can be controlled desirably to further improve the characteristics.

With the above arrangement, it is possible to realize a magnetic recording medium with a small layer thickness and a small product of residual magnetic flux density and layer thickness (Br δ) to satisfy a demand for a high recording density in recent years. The deterioration of the magnetic characteristics and the electromagnetic conversion characteristics with Br δ being small is mainly caused by a granular structure made unclear by the unstable growth of grains in a region with a small layer thickness (initial growth region).

The use of the non-magnetic intermediate layer according to the present invention easily achieves a high Hc and therefore eliminates the need for heating a substrate in the formation of the magnetic recording medium. This simplifies the manufacturing process, reduces the cost, and enables the use of inexpensive plastic as well as conventionally used Al or glass for the substrate.

Figure 1A:
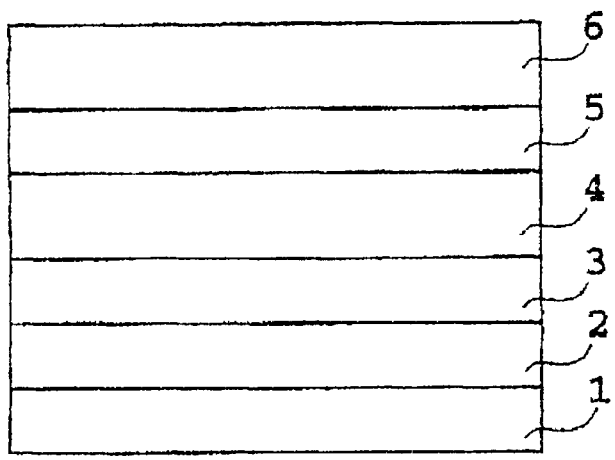
FIG. 1(a) is a schematic sectional view showing the structure of a magnetic recording medium according to the present invention.
Figure 1B:
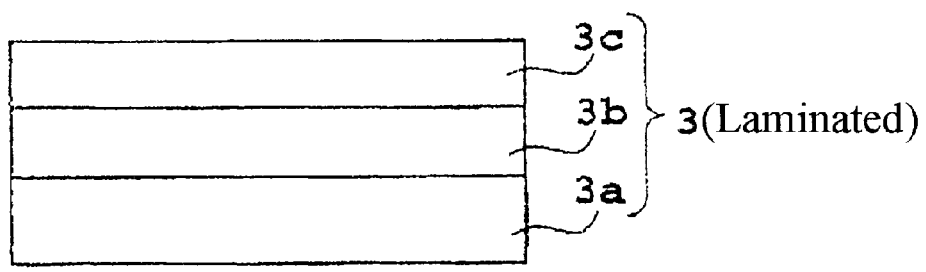
FIG. 1(b) is a schematic sectional view showing the structure of an intermediate layer in the magnetic recording medium shown in FIG. 1(a).

The magnetic recording medium according to the present invention as well as the process of manufacturing the same will now be described in further detail with reference to FIGS. 1(a) and 1(b). FIG. 1(a) is a schematic sectional view showing a magnetic recording medium according to an example of the present invention. In the magnetic recording medium in FIG. 1(a), a non-magnetic under-layer 2, a non-magnetic intermediate layer 3, a magnetic layer 4 and a protective layer 5 are sequentially formed on a non-magnetic substrate 1, and a liquid lubricant layer 6 is formed on the protective layer 5. FIG. 1(b) is a sectional view showing non-magnetic intermediate layer 3 comprised of two or more layers. The respective layers 3a, 3b, 3c are non-magnetic layers having the granular structure.

Non-magnetic substrate 1 is made of Al alloy plated with NiP, reinforced glass, crystallized glass, or the like. In addition, it is possible to use a substrate that is molded by injecting polycarbonate, polyolefin and other resins (plastic) since the present invention does not require the substrate to be heated in the manufacturing process.

Non-magnetic under-layer 2 is laminated on non-magnetic substrate 1 by an electron beam deposition method, a sputtering method, or the like. Non-magnetic under-layer 2 is made of non-magnetic material such as NiAl or Cr. Preferably, non-magnetic under-layer 2 is made of Cr or Cr alloy such as CrMo, CrTi, CrV or CrW alloy. Although the layer thickness of under-layer 2 is not particularly restricted, it is preferably between 5 nm and 50 nm.

Non-magnetic intermediate layer 3 is then laminated on non-magnetic under-layer 2. Non-magnetic intermediate layer 3 has the granular structure. More specifically, in non-magnetic intermediate layer 3, non-magnetic and non-metallic substances such as an oxide and a carbide is segregated around grains of non-magnetic substance made of metal or alloy. For example, non-magnetic intermediate layer 3 is formed, e.g. by sputtering of non-magnetic and metallic substance containing oxide or carbide constituting non-magnetic grain boundaries as a target, although the method for forming non-magnetic intermediate layer 3 is not particularly restricted. Alternatively, non-magnetic intermediate layer 3 is formed by reactive sputtering of non-magnetic and metallic substance as a target in an Ar gas containing oxygen.

The grains of non-magnetic substance in the non-magnetic intermediate layer used in the present invention are made of, e.g. CoCr alloy or CoCrPt alloy, but there is no intention to limit a material for the grains of non-magnetic substance to them. Such alloy is magnetic or non-magnetic according to the composition thereof, and thus, such a composition is selected that the alloy can be non-magnetic. Although a material for the non-magnetic grain boundaries is not particularly restricted, the non-magnetic grain boundaries are made of, e.g. non-magnetic and metallic oxide or carbide, such as Al, Si, Cr or Ti (including Si in this specification) oxide or carbide. More specifically, a desired effect such as high Hc and low noise can be achieved, e.g. in the case where $SiO_2$ is segregated around a CoCr alloy containing Cr of about 30 to 50%.

As stated above, non-magnetic intermediate layer 3 having the granular structure provided in the magnetic recording medium of the present invention controls the crystallinity of ferromagnetic grains in the magnetic layer laminated on non-magnetic intermediate layer 3 and the initial growth of the oxide or carbide grain boundaries. Further, as shown in FIG. 1(b), non-magnetic intermediate layer 3 is formed by laminating two or more non-magnetic layers (3a, 3b, 3c) having the granular structure. This improves the crystallinity of the non-magnetic layer formed just under the magnetic layer and reduces the grain size. Therefore, the magnetic layer is controlled desirably.

If non-magnetic intermediate layer 3 is comprised of laminated layers as shown in FIG. 1(b), a desired effect can be achieved regardless of whether the respective layers have identical or different compositions. If the layers have different compositions, the Cr concentration of the CoCr alloy or the like is different. The use of the layers having different compositions achieves more preferable magnetic characteristics and electromagnetic conversion characteristics.

Although the layer thickness of non-magnetic intermediate layer 3 is not particularly restricted, the total layer thickness is preferably between 1 nm and 20 nm irrespective of whether non-magnetic intermediate layer 3 is comprised of one or more layers.

Magnetic layer 4 is laminated on the obtained non-magnetic intermediate layer 3. Magnetic layer 4 is a so-called granular magnetic layer that is comprised of ferromagnetic grains and non-magnetic grain boundaries formed of metallic oxide or carbide. Such arrangement can be achieved by forming a layer by sputtering of, e.g. a ferromagnetic metal containing oxide or carbide constituting non-magnetic grain boundaries as a target, or by reactive sputtering of a ferromagnetic metal as a target in an Ar gas containing oxygen.

Although a material for ferromagnetic grains is not particularly restricted, it is preferable to use a CoPt alloy. In particular, it is preferable to add at least one element selected from a group consisting of Cr, Ni and Ta to the CoPt alloy in order to decrease media noise. On the other hand, a material for the non-magnetic grain boundaries is an oxide or a carbide of metal (including Si in this specification). More specifically, it is particularly preferable to use oxide of at least one element selected from a group consisting of Cr, Co, Si, Al, Ti, Ta, Hf and Zr in order to form a stable granular structure. Although the layer thickness of the magnetic layer is not particularly restricted, the layer thickness is determined so that a sufficient head output can be ensured in magnetic recording.

Protective layer 5 is lamented on magnetic layer 4. Protective layer may be formed by any conventional methods such as the sputtering method. For example, protective layer 5 is formed of a thin layer that is made mainly of carbon.

Liquid lubricant layer 6 is then laminated on protective layer 5. For example, liquid lubricant layer 6 can be formed by coating a lubricant of perfluoro polyether.

In this manner, the magnetic recording medium shown in FIG. 1 is produced.

The magnetic recording medium according to the present invention is capable of increasing Hc and decreasing media noise without heating the substrate as in the manufacture of a conventional magnetic recording medium. The magnetic recording medium according to the present invention therefore reduces the manufacturing cost by simplifying the manufacturing process.

Embodiments

Embodiments of the present invention will be described hereinbelow, but it is to be understood that there is no intention to limit the present invention to those embodiments.

Embodiment 1

A reinforced glass substrate having a smooth surface (N-10 glass substrate produced by HOYA Corp.) was used as non-magnetic substrate 1. Non-magnetic substrate 1 was cleaned and placed into a sputtering apparatus to form non-magnetic under-layer 2 with a thickness of 15 nm, comprised of a Cr—20 atomic % Mo (a Cr alloy containing 20 atomic % Mo, hereinafter expressed in the same manner) target under an Ar gas pressure of 50 mTorr. Non-magnetic granular intermediate layer 3, with a thickness of 20 nm, was then formed under an Ar gas pressure of 30 mTorr by the RF sputtering method using a Co—32 atomic % Cr target with $SiO_2$ of 6 mol % added thereto.

Granular magnetic layer 4, with a thickness of 15 nm, was then formed under an Ar gas pressure of 30 mTorr by the RF sputtering method using a Co—10 atomic % Cr—14 atomic % Pt target with $SiO_2$ of 7 mol % added thereto. Then, carbon protective layer 5, with a thickness of 10 nm, was laminated on granular magnetic layer 4, and a laminated product was taken out of vacuum. A liquid lubricant was then coated on protective layer 5 to form liquid lubricant layer 6 with a thickness of 1.5 nm, thus producing the magnetic recording medium shown in FIG. 1.

It should be noted that the substrate is not heated prior to the formation of the layers.

With regard to the magnetic characteristics of the produced magnetic recording medium, Hc and Br δ were measured using a vibrating sample magnetometer (VSM). With respect to the electromagnetic conversion characteristics, a regenerated output TAA of an isolated regeneration waveform, media noise and SNR (signal-to-noise ratio) were measured using a spin stand tester with a GMR head at a linear recording density of 120 kFCI.

Table 1 shows the composition of the lamination, and Table 2 shows the results of measurement representing the characteristics.

Embodiment 2

The magnetic recording medium shown in FIG. 1 was produced in the same manner as in the first embodiment except that non-magnetic intermediate layer 3 was comprised of two non-magnetic layers (3a, 3b) having the granular structure and each having a thickness of 10 nm (i.e. a total layer thickness of 20 nm).

The magnetic characteristics and the electromagnetic conversion characteristics of the produced magnetic recording medium were measured in the same manner as in the first embodiment.

Table 1 shows the composition of the lamination, and Table 2 shows the results of measurement representing the characteristics.

Embodiment 3

The magnetic recording medium shown in FIG. 1 was produced in the same manner as in the first embodiment except that non-magnetic intermediate layer 3 was comprised of three non-magnetic layers (3a, 3b, 3c) having a granular structure and each having a thickness of about 6.7 nm (i.e. a total layer thickness of 20 nm).

The magnetic characteristics and the electromagnetic conversion characteristics of the produced magnetic recording medium were measured in the same manner as in the first embodiment.

Table 1 shows the composition of the lamination, and Table 2 shows the results of measurement representing the characteristics.

Embodiment 4

The magnetic recording medium shown in FIG. 1 was produced in the same manner as in the first embodiment except that non-magnetic intermediate layer 3 was comprised of the following two layers each having a thickness of about 10 nm (i.e. a total layer thickness of 20 nm): the lower layer being formed of a Co—32 atomic % Cr target with $SiO_2$ of 6 mol % added thereto and the upper layer being formed of a Co—40 atomic % Cr target with $SiO_2$ of 8 mol % added thereto.

The magnetic characteristics and the electromagnetic conversion characteristics of the produced magnetic recording medium were measured in the same manner as in the first embodiment.

Table 1 shows the composition of the lamination, and Table 2 shows the results of measurement representing the characteristics.

Embodiment 5 through Embodiment 11

The magnetic recording medium shown in FIG. 1 was produced in the same manner as in the first embodiment except that non-magnetic intermediate layer 3 with the composition shown in Table 1 is comprised of two layers each having a thickness of 10 nm (i.e. a total layer thickness of 20 nm).

The magnetic characteristics and the electromagnetic conversion characteristics of the produced magnetic recording medium were measured in the same manner as in the first embodiment.

Table 2 shows the results of measurement representing the characteristics.

COMPARATIVE EXAMPLE 1

The magnetic recording medium shown in FIG. 1 was produced in the same manner as in the first embodiment except that magnetic layer 4 was laminated on non-magnetic under-layer 2 without forming non-magnetic intermediate layer 3.

The magnetic characteristics and the electromagnetic conversion characteristics of the produced magnetic recording medium were measured in the same manner as in the first embodiment.

Table 1 shows the composition of the lamination, and Table 2 shows the results of measurement representing the characteristics.

TABLE 1

| | Composition of Magnetic Layer | Intermediate Layer | | |
|---|---|---|---|---|
| | | No. of Lamination Layers | Comp. Of Lower Layer | Comp. Of Upper Layer |
| Embodiment 1 | Co—10Cr—14Pt—7$SiO_2$ | 1 | Co—32Cr—6$SiO_2$ | — |
| Embodiment 2 | Co—10Cr—14Pt—7$SiO_2$ | 2 | Co—32Cr—6$SiO_2$ | Co—32Cr—6$SiO_2$ |
| Embodiment 3 | Co—10Cr—14Pt—7$SiO_2$ | 3 | Co—32Cr—6$SiO_2$ | Co—32Cr—6$SiO_2$ |
| Embodiment 4 | Co—10Cr—14Pt—7$SiO_2$ | 2 | Co—32Cr—6$SiO_2$ | Co—40Cr—8$SiO_2$ |
| Embodiment 5 | Co—10Cr—14Pt—7$SiO_2$ | 2 | Co—32Cr—6$SiO_2$ | Co—30Cr—10Pt—6$SiO_2$ |
| Embodiment 6 | Co—10Cr—14Pt—7$SiO_2$ | 2 | Co—32Cr—2$Cr_2O_3$ | Co—32Cr—2$Cr_2O_3$ |
| Embodiment 7 | Co—10Cr—14Pt—7$SiO_2$ | 2 | Co—32Cr—2$Al_2O_3$ | Co—32Cr—2$Al_2O_3$ |
| Embodiment 8 | Co—10Cr—14Pt—7$SiO_2$ | 2 | Co—30Cr—10Pt—6$SiO_2$ | Co—30Cr—10Pt—6$SiO_2$ |
| Embodiment 9 | Co—10Cr—14Pt—7$SiO_2$ | 2 | Co—32Cr—6SiC | Co—32Cr—6SiC |
| Embodiment 10 | Co—10Cr—14Pt—7$SiO_2$ | 2 | Co—32Cr—6TiC | Co—32Cr—6TiC |
| Embodiment 11 | Co—10Cr—14Pt—7$SiO_2$ | 2 | Co—32Cr—6SiC | Co—32Cr—6SiC |
| Comp. Ex. 1 | Co—10Cr—14Pt—7$SiO_2$ | 0 | — | — |

TABLE 2

|  | Hc (Oe) | Br δ (G μm) | Regenerated Output (mVp-p) | Media Noise (μV) | SNR (dB) |
|---|---|---|---|---|---|
| Embodiment 1 | 3345 | 60 | 0.71 | 24.1 | 22.6 |
| Embodiment 2 | 3423 | 63 | 0.72 | 22.4 | 22.9 |
| Embodiment 3 | 3470 | 59 | 0.70 | 22.2 | 23.1 |
| Embodiment 4 | 3518 | 60 | 0.69 | 21.9 | 23.4 |
| Embodiment 5 | 3553 | 62 | 0.72 | 21.2 | 23.8 |
| Embodiment 6 | 3451 | 61 | 0.71 | 22.6 | 22.8 |
| Embodiment 7 | 3412 | 62 | 0.71 | 22.1 | 23.1 |
| Embodiment 8 | 3514 | 59 | 0.70 | 21.9 | 23.5 |
| Embodiment 9 | 3011 | 60 | 0.70 | 24.3 | 22.2 |
| Embodiment 10 | 2965 | 61 | 0.71 | 25.4 | 22.0 |
| Embodiment 11 | 3122 | 63 | 0.73 | 23.8 | 22.5 |
| Comp. Ex. 1 | 3088 | 59 | 0.71 | 29.2 | 21.6 |

As is apparent from Table 2, the magnetic recording medium of the present invention having non-magnetic granular intermediate layer 3 is able to increase the magnetic coercive force Hc and decrease the media noise to a larger degree than in the comparative example 1. In particular, it was found that the characteristics of the magnetic recording medium having the non-magnetic intermediate layer comprised of two or more layers were effectively improved. More specifically, compared with the comparative example 1, the Hc is increased by about 260 Oe and the SNR is increased by +1 dB in the embodiment 1 wherein non-magnetic intermediate layer 3 is comprised of a single layer formed of Co—32 atomic % Cr—6 $SiO_2$ with a total layer thickness of 20 nm, the Hc is increased by about 340 Oe and the SNR is increased by +1.3 dB in the embodiment 2 wherein the non-magnetic intermediate layer is comprised of two layers having the same composition with a total layer thickness of 20 nm, and the Hc is increased by about 380 Oe and the SNR is increased by +1.5 dB in the embodiment 3 wherein the non-magnetic intermediate layer 3 is comprised of three layers having the same composition with a total layer thickness of 20 nm.

In the embodiments 4 and 5 wherein non-magnetic intermediate layer 3 is comprised of two non-magnetic granular layers having different compositions and has a total layer thickness of 20 nm, the Hc was increased by about 430 Oe and the SNR was increased by +1.8 dB in the embodiment 4 and the Hc was increased by about 460 Oe and the SNR was increased by +2.2 dB in the embodiment 5. Thus, the embodiments 4 and 5 achieve the most advantageous effects among the embodiments of the present invention.

This is considered to be because a degree to which the grain size is reduced and the segregation structure is made clear in the granular intermediate layer just under the magnetic layer and the granular magnetic layer is varied according to materials for the non-magnetic intermediate layer.

Likewise, in the case of the magnetic recording medium in which the non-magnetic grain boundaries in the non-magnetic intermediate layer were made of Cr (Embodiment 6) and Al (Embodiment 7) oxide, not Si oxide, the Hc was increased by about 320 to 360 Oe and the SNR was increased by about 1.2 to 1.5 dB.

In the magnetic recording medium in which the non-magnetic grain boundaries in the non-magnetic intermediate layer were made of the Co—Cr—Pt alloy (Embodiment 8), the Hc was increased by about 430 Oe and the SNR was increased by 1.9 dB.

Further, the higher Hc and SNR can be achieved by a magnetic recording medium whose non-magnetic layer is comprised of layers with different compositions as is the case with the magnetic recording mediums (Embodiments 2 and 4) containing the corresponding oxides, compared with the magnetic recording mediums (Embodiments 9 to 11) containing carbide, not oxide. Although the Hc in the embodiments 9 and 10 was slightly decreased from Hc in the comparative example, a preferable magnetic recording medium exhibiting decreased media noise and increased SNR was produced.

Embodiment 12

The magnetic recording medium shown in FIG. 1 was produced in the same manner in the embodiment 2, except that the thickness of magnetic layer 4 was changed to 5 to 15 nm.

Figure 2:
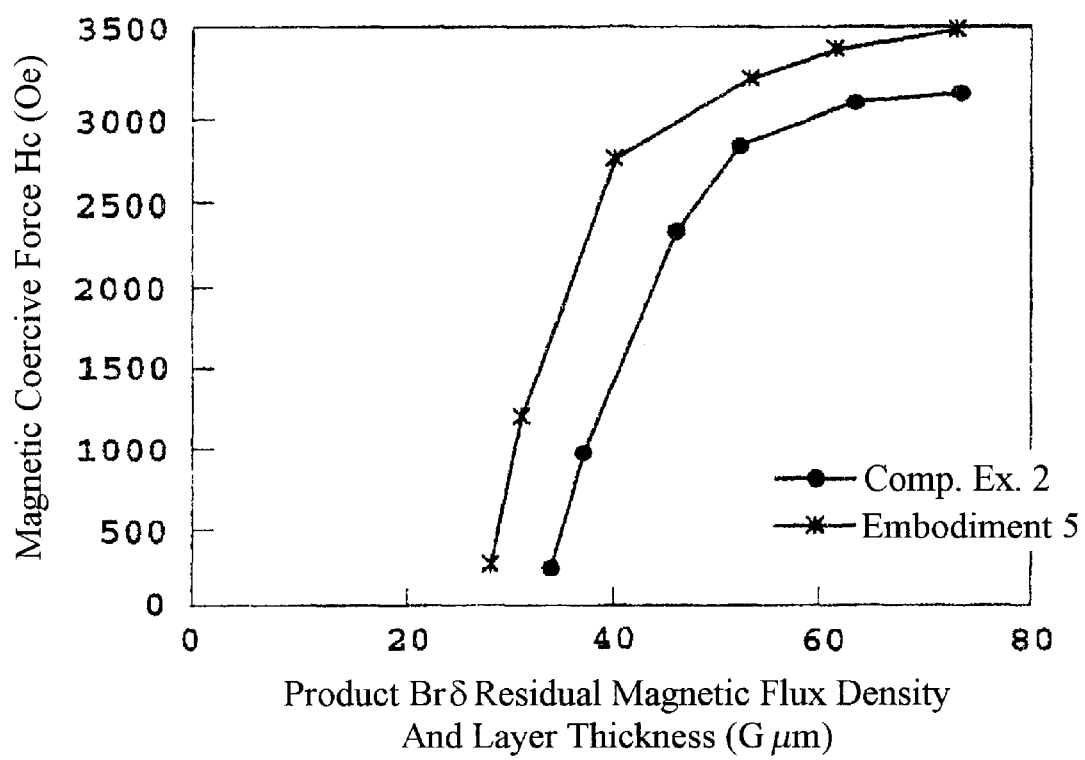
FIG. 2 is a diagram showing the change in a magnetic coercive force Hc with the change in a product of residual magnetic flux density and layer thickness.

With regard to each magnetic recording medium, the magnetic coercive force Hc and Br δ were measured using a vibrating sample magnetometer (VSM). FIG. 2 shows the results of the measurement.

COMPARATIVE EXAMPLE 2

The magnetic recording medium having the structure shown in FIG. 1 was produced in the same manner in the embodiment 1 except that magnetic layer 4, with a thickness of 7 to 15 nm, was formed directly on the non-magnetic under-layer.

With regard to each magnetic recording medium, the magnetic coercive force Hc and Br δ were measured using a vibrating sample magnetometer (VSM). FIG. 2 shows the results of the measurement.

As is apparent from FIG. 2, showing the dependency of the magnetic coercive force Hc of the magnetic recording medium on Br δ in the Comparative Example 2, the magnetic characteristics are considerably deteriorated if Br δ is not greater than 50 μm. This results from the unclear granular structure in the initial growth region (with a small Br δ) in the granular magnetic layer. However, the magnetic recording medium according to the Embodiment 12 of the present invention having the non-magnetic granular intermediate layer has the granular structure just under the granular magnetic layer to facilitate the epitaxial growth of the granular magnetic directly upward. This achieves a relatively clear segregation structure even in the initial growth region. Thus, in the region with a small Br δ, the magnetic characteristics are improved to a larger extent than in the Comparative Example 2.

Effect of the Invention

As stated above, compared with the conventional magnetic recording medium in which the granular magnetic layer is provided without forming the intermediate layer, the magnetic recording medium of the present invention comprising non-magnetic intermediate layer having the granular structure under the magnetic layer exhibits higher Hc and lower noise. Moreover, the present invention achieves a high Hc can even if the amount of Pt in the magnetic layer target is reduced, and the decrease in the amount of Pt decreases the noise.

In addition, the present invention improves the media characteristics in the region with a small Br δ, and therefore the present invention is advantageous to the decrease in Br δ of the magnetic layer accompanying the increase in the recording density in the future.

On the other hand, oxide of at least one element selected from Cr, Co, Si, Al, Ti, Ta, Hf and Zr is used as the non-magnetic and non-metallic substance in the granular magnetic layer and the CoPt alloy to which at least one element selected from a group consisting of Cr, Ni and Ta is used as the ferromagnetic grains in the granular magnetic layer, and Cr or Cr alloys are used to form the non-magnetic under-layer. This further improves the magnetic characteristics and the electromagnetic conversion characteristics.

Further, the laminating structure of the non-magnetic intermediate layer easily increases Hc, and this eliminates the need for heating the substrate in the formation of the magnetic recording medium according to the present invention. This enables the use of inexpensive plastic as well as conventionally used Al or glass for the substrate.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A magnetic recording medium comprising:

a non-magnetic substrate;

a non-magnetic underlayer on said non-magnetic substrate;

a non-magnetic intermediate layer on said non-magnetic underlayer;

a magnetic layer on said non-magnetic intermediate layer;

a protective layer on said magnetic layer;

a liquid lubricant layer on said protective layer;

said magnetic layer includes ferromagnetic grains and nonmagnetic grain boundaries, formed of at least one of a metallic oxide and a carbide, surrounding said ferromagnetic grains; and wherein said non-magnetic intermediate layer comprises at least two laminated layers having identical or different compositions, and wherein said at least two laminated layers both comprise grains of non-magnetic substance, and non-magnetic grain boundaries formed of at least one of a metallic oxide and a carbide, surrounding said grains of non-magnetic substance.

2. The magnetic recording medium according to claim 1, wherein said grains of non-magnetic substance in said non-magnetic intermediate layer are CoCr alloys or CoCrPt alloys.

3. The magnetic recording medium according to claim 1, wherein said non-magnetic underlayer is made of either Cr or a Cr alloy.

4. The magnetic recording medium according to claim 1, wherein said non-magnetic substrate is made from a substance selected from the group consisting of crystallized glass, reinforced glass, and plastic.

5. The magnetic recording medium according to claim 1, wherein said magnetic layer has a thickness between 5 and 15 nm.

* * * * *